(No Model.)
H. F. HODGES.
UNIVERSAL ANGLE COUPLING AND UNION.
No. 327,877. Patented Oct. 6, 1885.
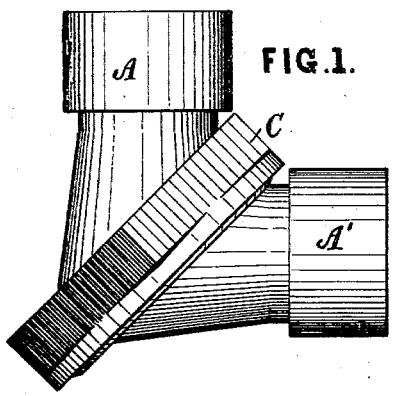
FIG.1.
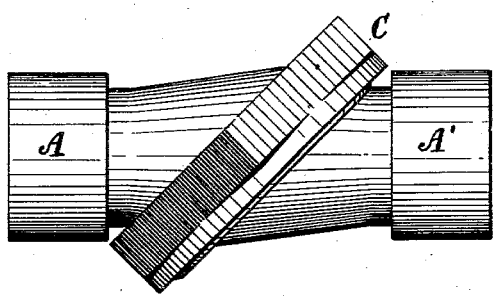
FIG.2.
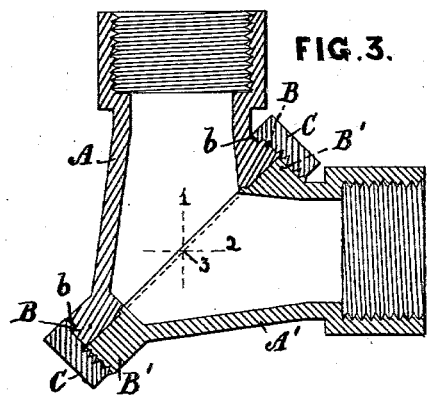
FIG.3.
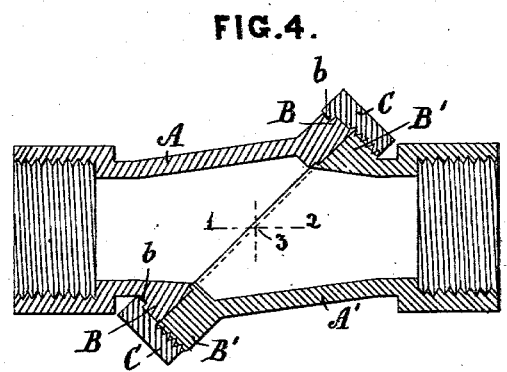
FIG.4.
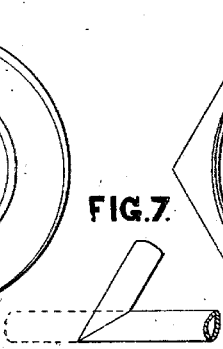
FIG.5.
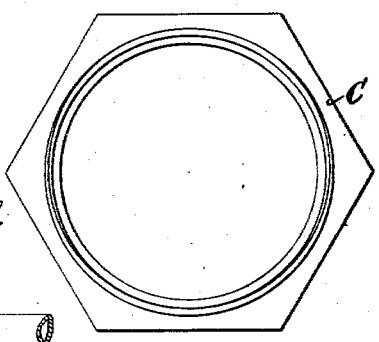
FIG.6.
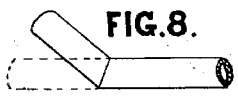
FIG.7.
FIG.8.
Witnesses.
Ira D. VanDusen
E. Planta.
Inventor.
Horace F. Hodges
by J. H. Adams
Attorney.

UNITED STATES PATENT OFFICE.

HORACE F. HODGES, OF BOSTON, ASSIGNOR TO CHARLES F. PAYNE, OF GROVELAND, AND GEORGE H. SPENCER AND CHARLES T. CROCKER, OF FITCHBURG, MASSACHUSETTS.

UNIVERSAL ANGLE COUPLING AND UNION.

SPECIFICATION forming part of Letters Patent No. 327,877, dated October 6, 1885.

Application filed March 1, 1884. Serial No. 122,676. (No model.)

*To all whom it may concern:*

Be it known that I, HORACE F. HODGES, a citizen of the United States, residing at Boston, in the county of Suffolk and State of Massachusetts, have invented a new and useful Universal Angle Coupling and Union, of which the following is a specification.

The object of my invention is to produce a pipe-coupling and "union" which, in addition to its function as a union, serves also to divert the course of the pipe to which it is joined to any angle that may be required, ranging, practically, through the entire number of degrees in the circumference of a circle, with the least possible obstruction to fluids passing through the same, by which means the necessity and inconvenience of using elbows having a fixed angle and the bending of the pipes are obviated.

My invention consists in the improved construction hereinafter specified, and set forth in my claim.

In the accompanying drawings, Figure 1 represents the coupling with the pipes at right angles one with the other. Fig. 2 is the same with the pipes on a line one with the other. Figs. 3 and 4 are sections of Figs. 1 and 2. Fig. 5 is one face of the coupling. Fig. 6 represents the nut used for binding the two faces of the coupling together. Figs. 7 and 8 show pipes joined at a greater and less angle than in Figs. 1 to 4.

A A' are the two pipes to be connected together, each being provided with a suitable screw-thread at their ends for connecting with the proper pipes.

B B' are the circular faces of the coincident ends of the pipes, and their planes are at an angle of forty-five degrees with the center lines of their respective pipes, their centers also being upon the said center lines. The face B of pipe A is provided with a shoulder, *b*, against which the nut C abuts in securing the two faces together, and the face B' of pipe A' is provided on its circumference with a screw-thread, as shown.

C is an ordinary union-nut, by which the two faces are firmly secured together. When the faces B B' are thus secured together, the center lines of the two parts meet on the plane of the coincident faces, so that, however either part may be rotated upon the other, the angle of the center lines of the two pipes is in the center of the joint, thus making a continuous passage through the pipes without any obstructing angle or offset, excepting the selected angle of the pipes, thus providing as free a passage as in a pipe bent to the same angle.

In Figs. 3 and 4 the dotted line 1 represents the center line of the part A, and 2 the center line of the part A'. The dotted line 3 is in the plane of the faces B B'. It will be seen that in both figures the lines 1 and 2 meet upon the line 3. If, now, the coupling being in the position shown in Fig. 4, the face B be rotated upon the face B', the angle of the lines 1 and 2 will gradually increase until at one-half of a revolution they will form an angle of ninety degrees, as shown in Fig. 3. Continuing the rotation, the angle will gradually diminish until it assumes its position again, as in Fig. 4, when the angle will entirely disappear.

The coupling may be secured at any point in the rotation, as described, by tightening the nut C.

The range of the angle will be equal to one hundred and eighty degrees minus twice the angle which the plane of the faces forms with the center lines of the pipes. In Figs. 1 to 4 a coupling is shown whose contiguous faces are at an angle of forty-five degrees with the center line of their respective ends; therefore 180° (45°×2)=90°, which is the range of the coupling shown.

I do not confine myself to a particular angle of the faces, as above described, as the faces may be set at any other angle with the center line of the pipe without departing from the spirit of my invention; but the range of variation of the angles which may be obtained with this device increases as the angle diminishes below that shown, and vice versa—as, for instance, in Fig. 7 the angle of the faces with the center line of the pipes is thirty degrees and the range one hundred and twenty degrees. In Fig. 8 the angle of the faces is shown as at seventy degrees, and the range of variation is forty degrees. In practice a range of variation of ninety degrees would be that most generally in use, as the remaining ninety degrees can be readily obtained by the addition of a common ninety-degree elbow to one of the pipes A A', if required.

Any other ordinary means for securing pipe-flanges together may be employed, the main feature of the invention being the connecting of the two pipes together in such a way that the angle of the line of their courses may be varied, while the coincidence of their center lines remains the same.

What I claim as my invention is—

In a universal angle coupling and union, a face or screw-head set at an angle other than ninety degrees with its pipe-connection, and concentric with the produced center line of said pipe-connection where it intersects the plane of said face, and having a circular central opening enlarged to a diameter equal to or exceeding the greatest diameter of the elliptical opening formed by cutting the pipe-connection at the angle employed and concentric with said center line, the walls of said coupling tapering gradually and regularly from near the enlarged circular opening in the center of its oblique face to near the point of its pipe-connection, substantially as and for the purpose specified.

In testimony whereof I have signed my name to this specification in the presence of two subscribing witnesses.

HORACE F. HODGES.

Witnesses:
 JOS. H. ADAMS,
 E. PLANTA.